United States Patent
Nadeau et al.

(10) Patent No.: US 6,455,189 B1
(45) Date of Patent: Sep. 24, 2002

(54) BATTERY OF ELECTROCHEMICAL CELLS WITH CONTACT ELEMENTS

(75) Inventors: Eric Nadeau, Savigny l'Evescault; Dominique Demarty, Chasseneuil, both of (FR)

(73) Assignee: Alcatel, Paris (FR)

( * ) Notice: Subject to any disclaimer, the term of this patent is extended or adjusted under 35 U.S.C. 154(b) by 86 days.

(21) Appl. No.: 09/665,518

(22) Filed: Sep. 19, 2000

(30) Foreign Application Priority Data

Sep. 20, 1999 (FR) .............................. 99 11727

(51) Int. Cl.⁷ .............................. H01M 2/30
(52) U.S. Cl. ................. 429/121; 429/123; 429/181
(58) Field of Search .................. 429/90–93, 96, 429/99–100, 121–123, 149, 178–181; 439/135–136, 149, 166, 171, 346, 347, 500, 627, 709, 711

(56) References Cited

U.S. PATENT DOCUMENTS 3,625,774 A * 12/1971 Rodgers ..................... 429/121
5,437,938 A * 8/1995 Mitsui et al. ................... 429/1
5,736,271 A * 4/1998 Cisar et al. .................... 429/96

FOREIGN PATENT DOCUMENTS

| DE | 4406879 A1 | * 9/1995 |
| DE | 29803976 U1 | * 7/1998 |
| DE | 298 03 976 U1 | 8/1998 |
| EP | 1085587 A1 | * 3/2001 |
| JP | 63-264861 | 11/1988 |

* cited by examiner

Primary Examiner—Patrick Ryan
Assistant Examiner—Susy Tsang-Foster
(74) Attorney, Agent, or Firm—Sughrue Mion, PLLC

(57) ABSTRACT

A battery of electrochemical cells placed in a container of insulating material that has at least one wall including contact elements to connect the battery to an external application. The contact elements are grouped together and separated from one another by partitions of insulating material thus forming a single terminal unit, with the partitions and the wall being made as a single piece.

11 Claims, 3 Drawing Sheets

BATTERY OF ELECTROCHEMICAL CELLS WITH CONTACT ELEMENTS

The present invention relates to a battery of primary or secondary electrochemical cells that includes electrical contact elements to pass electricity and to enable information concerning the characteristics of the battery to be collected. These contact elements are designed to co-operate with a connector carried by an external application to which the battery is to be connected, e.g. a piece of telecommunications equipment.

BACKGROUND OF THE INVENTION

A battery is made up of a plurality of electrochemical cells connected in series and/or in parallel and assembled together in a common container. In general, a battery has common terminals respectively of positive and of negative polarity that are used for electrically powering an appliance external to the battery. Other information may be needed to enable the battery to operate properly, in particular its temperature or the state of charge of its cells. This information is obtained by measuring directly or by collecting information that has been stored. The information is transmitted to the external appliance via contact elements that enable links to be established.

Document EP-0 349 473 describes a battery having a container through which the terminals pass. A connector for connecting the terminals to a plurality of pluggable cables is integrated with or secured to the container, preferably by being embedded in the plastics material of the battery container. When the connector is integrated in the cover, it is held between the top portion and the bottom portion of the cover. It can also be inserted in a housing provided in the side wall and held in place by a catch.

In that case, common current inlet and outlet is provided by conventional type terminals connected to a connector which serves to increase the possible number of connections. A drawback of such a battery lies in the problem of fixing the additional connector so that it is held securely, and in the resulting bulk.

Document DE-4 406 079 describes a storage cell container made up of a bottom box and a base carrying a male connector for making a connection either to a charger or to a machine tool.

However in certain particular applications, the batteries need to be immersed. It is essential for the battery and for the connector to be leakproof. Wherever a component is integrated on the outside there is always a source of risk for overall sealing.

Document GB-2 183 081 relates to a leakproof container for receiving and protecting a battery. The cover of the container has two terminals constituting male pieces suitable for engaging the female ends of the terminals of the battery. The terminals of the container can be connected to coupling connectors.

The container placed around the battery pointlessly adds volume and additional weight, and that is usually not desired by users.

In addition, the connectors used in those known batteries are standard commercial components for a variety of uses such that their very versatility makes them complex. As a result they are not exactly suited to battery manufacturers and their cost is found to be excessive.

OBJECTS AND SUMMARY OF THE INVENTION

An object of the present invention is to propose a battery capable of being connected to an external application, where the cost of manufacturing the battery is reduced and where the battery is closely matched to user requirements.

Another object of the invention is to provide a battery whose sealing in the event of immersion is more reliable.

The present invention provides a battery of electrochemical cells placed in a container of insulating material having at least one wall carrying a terminal unit for connecting said battery to an external application, wherein said terminal unit is a leakproof female terminal unit constituted by a body of insulating material having sockets, said body being integrally formed with said wall, the terminal unit also comprising partially hollow contact elements of tubular shape and of outside diameter no greater than 2.9 mm, said elements being placed in said sockets and sealing between said body and said elements being provided by a resin.

The insulating material is selected from polyamides, polyolefins such as polyethylene (PE) or polypropylene (PP), polystyrenes, polycarbonates, polyphenylene oxide (PPO), and acrylonitrile/butadiene/styrene (ABS) copolymers.

The insulating material is preferably polyamide 6—6. Its characteristic, in particular its mechanical, chemical, and electrical characteristics, correspond to those desired. Its use is advantageous because of the ease with which it can be molded and its low cost.

In an embodiment of the invention, said insulating material further contains a reinforcing agent. Said reinforcing agent is preferably constituted by glass fibers.

Preferably, said insulating material is polyamide 6—6 containing 30% by weight of glass fibers.

The battery of the invention has a female type terminal unit whose contact elements are tubular in shape and partially hollow. The tubular elements have a hollow section at each end for receiving at one end connection pieces coming from the battery and at the other end pluggable pins belonging to a suitable male connector. Because of the clearance that exists between the contact element and the wall of the housing, the hollow ends have a certain amount of flexibility which makes plugging easier.

Advantageously, the contact elements are provided with an annular external shoulder. When the connector element is put into place in the socket passing through the insulating body of the terminal unit, the shoulder comes to bear against a step formed on the inside wall of the socket. Under such circumstances, somewhat more clearance can be provided.

The battery is sealed at said terminal unit by resin which is inserted into the inside portion of the terminal unit fitted with said contact elements that are electrically connected to the electrochemical cells. The shoulder then serves as a barrier preventing the resin from escaping to the outside. It is also used to determine accurately the quantity of resin that is required. When the element does not have a shoulder, then the viscosity of the resin in association with the small amount of clearance between the element and the wall of the housing prevents the resin from penetrating beyond the desired limit.

Furthermore, the connection between said terminal unit and a connector connected to said application is sealed by means of a gasket surrounding the outside of said terminal unit and against which said connector comes to bear. The gasket is preferably received in a housing provided for that purpose. During plugging, the insulating body of the connector comes into contact with the portion of the terminal unit where the gasket is placed.

The present invention also provides a method of manufacturing the above-described battery, in which method said wall and said insulating body are made simultaneously by molding, preferably by injection molding.

An advantage of the present invention is that it makes it possible to avoid the problem of inserting and fixing a connector to the battery container both in terms of support and in terms of sealing the interface. The method of manufacture is thus shortened and simplified since the number of parts and the number of assembly operations is reduced. Battery manufacture is cheaper and more reliable.

BRIEF DESCRIPTION OF THE DRAWINGS

The invention will be better understood and other advantages and features will appear on reading the following description given by way of non-limiting example and with reference to the accompanying drawings, in which.

MORE DETAILED DESCRIPTION

Figure 1:
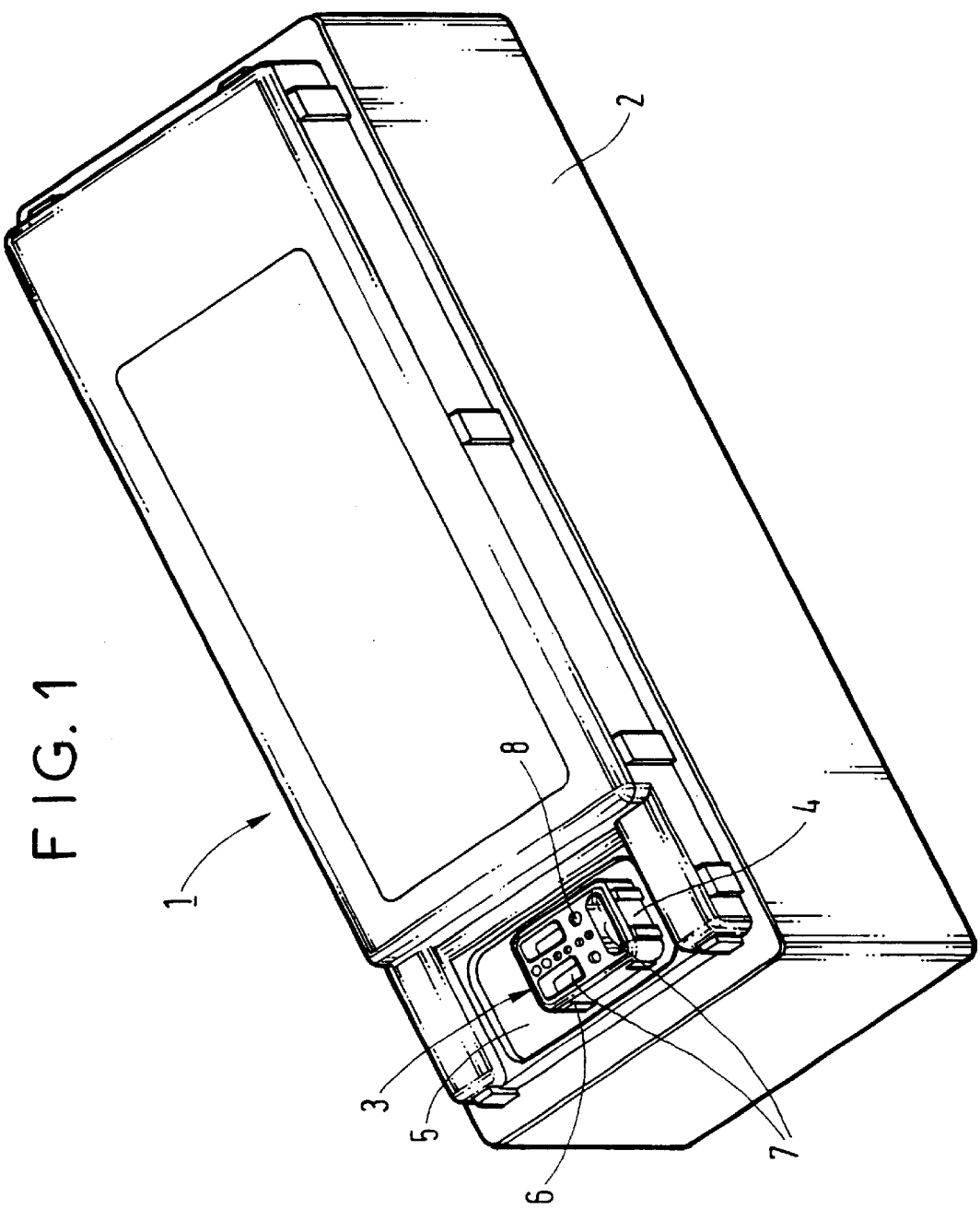
FIG. 1 is a perspective view of a battery of the invention.

FIG. 1 shows a particular embodiment of a battery 1 of the present invention. The battery 1 possesses a prismatic container 2 which is closed by a bottom (not shown). The top face of the container 2 includes a terminal unit 3 whose insulating body 4 is an integral portion of the container 2. The terminal unit 3 is surrounded by a housing 5 for receiving a sealing gasket. The terminal unit 3 carries ribs 6 that guide the plugging of a suitable external connector. Recesses 7 can be provided in the body 4 of the terminal unit 3 in order to receive pins of the connector that are not required by the battery.

Figure 2:
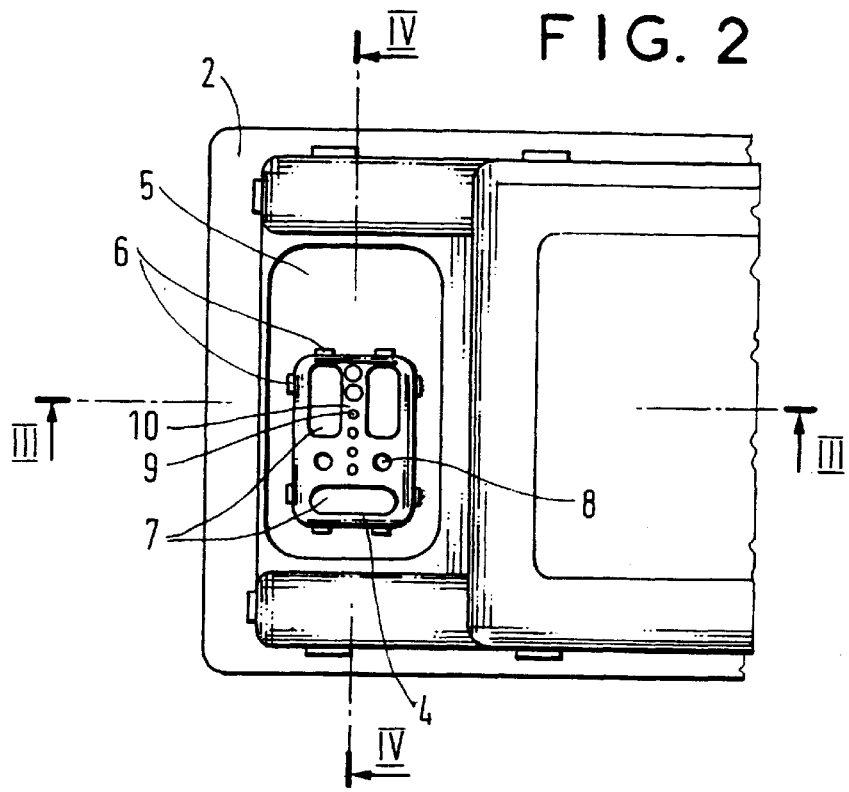
FIG. 2 is a fragmentary plan view of the container of the FIG. 1 battery.
Figure 3:
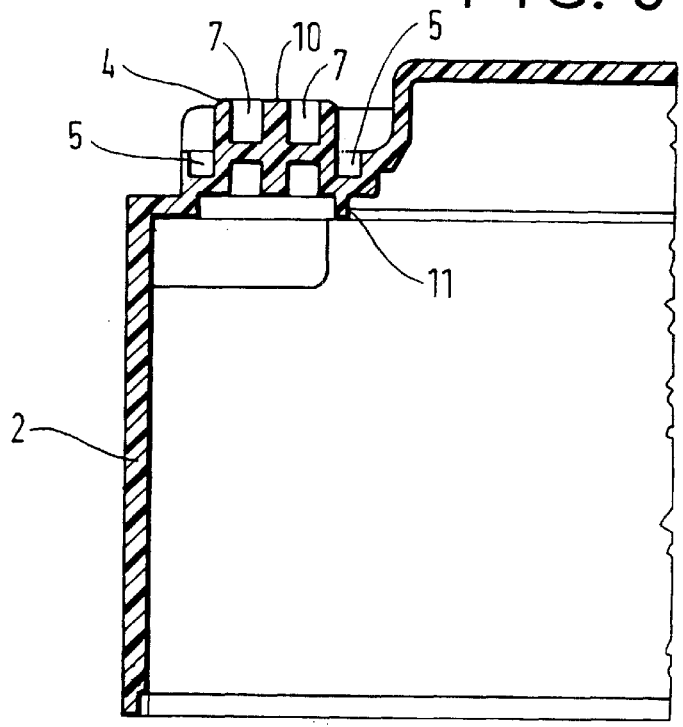
FIG. 3 is a fragmentary longitudinal section view of the container of the FIG. 1 battery.
Figure 4:
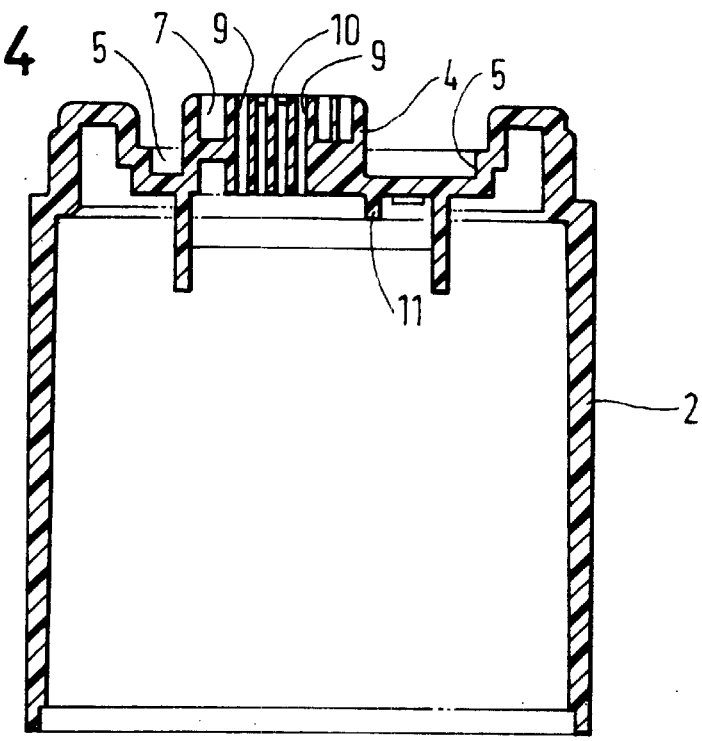
FIG. 4 is a cross-section view of the container of the FIG. 1 battery.

FIGS. 2 to 4 are a plan view and section views showing the end of the container 2 of the battery 1 that has the body 4 of the terminal unit 3. To establish an electrical electrical connection between the battery 1 and an external application, the body 4 of the unit 3 has sockets 8 and 9 which are separated by insulating partitions 10 and which are designed to receive elements suitable for establishing contact with a suitable connector connected to an external application. The sockets 8 are designed, for example, to receive conductor elements that constitute the positive and negative poles respectively of the battery for delivering electrical power to the application. The sockets 9 are designed, for example, to receive contact elements for transmitting information about the battery to the application. The face of the body 4 situated on the inside of the container 2 is provided with a rim 11 preventing resin from escaping.

The terminal unit of the invention presents the advantage of not adding additional volume to the battery since it is contained in the envelope volume of the container, as defined by the intersections between its horizontal and vertical faces.

Figure 5:
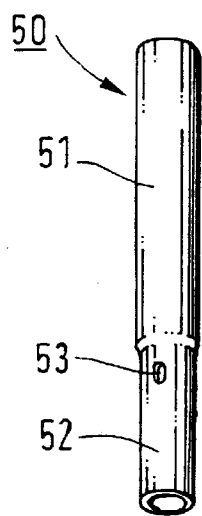
FIG. 5 shows a variant of the contact element in the terminal unit of the invention.

FIG. 5 shows a contact element 50 which is in the form of a tubular conductive bushing. In the present case, the diameter of the portion 51 towards the outside can be about 1.6 mm and the diameter of the portion 52 towards the inside is about 1.2 mm. A circular hole 53 is made through the wall of the internal portion 52 of the bushing 50 so as to allow gas to escape if it is desired to solder a connection in the portion 52. These contact elements are intended specifically for transmitting information.

Figure 6:
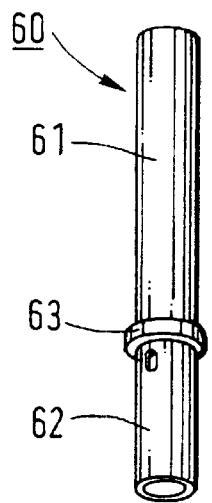
FIG. 6 shows another variant of a contact element.

FIG. 6 shows a contact element 60 in the form of a tubular-shaped conductive bushing. In the present case, the diameter of its portion 61 towards the outside is about 2.9 mm, for example, and the diameter of its portion 62 towards the inside is about 2.6 mm. The bushing 60 carries an annular shoulder 63 placed about two-thirds of the way along its length and separating the two portions 61 and 62. By way of example, the outside diameter of the shoulder 63 is about 3.3 mm. These contact elements are intended specifically for use as power outlets from the battery.

Figure 7:
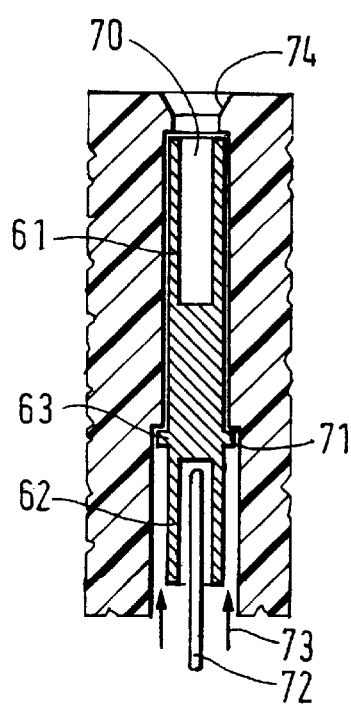
FIG. 7 is a section view showing the position of the FIG. 6 contact element in the body of the terminal unit.

When the bushing 60 is placed in the socket 70 as shown in section in FIG. 7, the shoulder 63 bears against a step 71 in the wall of the socket 70. A conductor wire 72 that is electrically connected to the electrochemical cells is inserted in the internal portion 62 of the bushing 60 to be crimped therein. Then the resin of viscous consistency is injected as represented by arrows 73 and does not penetrate beyond the shoulder 63. The external portion 61 of the bushing 60 is designed to receive the pin of an external connector. A chamfer 74 facilitates insertion of the pin.

What is claimed is:

1. A battery of electrochemical cells placed in a container of insulating material having at least one wall carrying a terminal unit for connecting said battery to an external application, wherein said terminal unit is a leakproof female terminal unit constituted by a body of insulating material having sockets, said body being integrally formed with said wall, the terminal unit also comprising contact elements including a tubular portion having an outside diameter no greater than 2.9 mm, said elements being placed in said sockets and sealing between said body and said elements being provided by a resin.

2. A battery according to claim 1, wherein said insulating material is selected from the group consisting of polyamides, polyolefins, polystyrenes, polycarbonates, polyphenylene oxide, and acrylonitrile/butadiene/styrene copolymers.

3. A battery according to claim 2, wherein said insulating material is polyamide 6-6.

4. A battery according to claim 1, wherein said insulating material further contains a reinforcing agent.

5. A battery according to claim 4, wherein said reinforcing agent is constituted by glass fibers.

6. A battery according to claim 5, wherein said insulating material is polyamide 6-6 and contains 30% by weight of glass fibers.

7. A battery according to claim 1, wherein the contact elements further include respective annular outside shoulders.

8. A battery according to claim 1, in which a connection between said terminal unit and a connector connected to said application is sealed by a gasket surrounding the outside of said terminal unit and against which said connector comes to bear.

9. A method of manufacturing a battery according to claim 1, wherein said wall and said body are made simultaneously by molding.

10. A method of manufacturing a battery according to claim 9, wherein said wall and said body are made by injection molding.

11. A battery of electrochemical cells placed in a container of insulating material having at least one wall carrying a terminal unit for connecting said battery to an external application, wherein said terminal unit is a leakproof female terminal unit constituted by a body of insulating material having sockets, said body being integrally formed with said wall, the terminal unit also comprising contact elements placed in said sockets and sealing between said body and said elements being provided by a resin.

* * * * *